US012665775B2

(12) United States Patent
Huang et al.

(10) Patent No.:  US 12,665,775 B2
(45) Date of Patent:  Jun. 23, 2026

(54) METHODS, PROTOCOLS, AND APPARATUSES OF QUANTUM PHYSICAL UNCLONABLE FUNCTIONS

(71) Applicant: The Trustees of the Stevens Institute of Technology, Hoboken, NJ (US)

(72) Inventors: Yuping Huang, Norwood, NJ (US); Lac Thi Thanh Nguyen, Jersey City, NJ (US)

(73) Assignee: The Trustees of the Stevens Institute of Technology, Hoboken, NJ (US)

( * ) Notice: Subject to any disclaimer, the term of this patent is extended or adjusted under 35 U.S.C. 154(b) by 307 days.

(21) Appl. No.: 18/580,529

(22) PCT Filed: Jul. 22, 2022

(86) PCT No.: PCT/US2022/038068
§ 371 (c)(1),
(2) Date: Jan. 18, 2024

(87) PCT Pub. No.: WO2023/004148
PCT Pub. Date: Jan. 26, 2023

(65) Prior Publication Data
US 2024/0333536 A1      Oct. 3, 2024

Related U.S. Application Data

(60) Provisional application No. 63/224,820, filed on Jul. 22, 2021.

(51) Int. Cl.
*H04L 9/32*           (2006.01)
*G06F 21/44*          (2013.01)
*H04L 9/08*           (2006.01)

(52) U.S. Cl.
CPC ............ *H04L 9/3278* (2013.01); *G06F 21/44* (2013.01); *H04L 9/0852* (2013.01)

(58) Field of Classification Search
CPC ....... G06F 21/44; G09C 1/00; H04L 2209/34; H04L 9/001; H04L 9/0852; H04L 9/3278
See application file for complete search history.

(56)                References Cited

U.S. PATENT DOCUMENTS

| | | | |
|---|---|---|---|
| 10,860,746 B2 | 12/2020 | Foster et al. | |
| 2019/0156066 A1 * | 5/2019 | Foster ..................... G06F 21/72 |
| 2020/0119748 A1 * | 4/2020 | Lucarelli ................ H03M 13/11 |

(Continued)

OTHER PUBLICATIONS

Examination Report issued for European Patent Application No. 22755350.0 entitled "Methods, Protocols, and Apparatuses of Quantum Physical Unclonable Functions," dated Sep. 12, 2025, 4 pages.

(Continued)

*Primary Examiner* — Theodore C Parsons
(74) *Attorney, Agent, or Firm* — Clark Hill PLC; Ralph W. Selitto; John K. Kim

(57)                ABSTRACT

A method for authentication between multiple communication parties is disclosed. Authentication can be carried out by the means of each communication party having a device having a physical unclonable function. To make this possible, the devices have a known quantum correlation that can be used in conjunction with entangled photons to verify the identities of the devices.

15 Claims, 12 Drawing Sheets

(56) References Cited

U.S. PATENT DOCUMENTS

2022/0376934 A1* 11/2022 Thornton .............. H04L 9/3278
2024/0333536 A1* 10/2024 Huang ................... G06F 21/44

OTHER PUBLICATIONS

PCT International Search Report and Written Opinion for PCT/US2022/03068 entitled "Methods, Protocols, and Apparatuses of Quantum Physical Unclonable Functions," mailed on Nov. 7, 2022, 15 pages.
Sebastianus A. Goorden et al., "Quantum-Secure Authentication with a Classical Key," Optica 1 (6), 421-424, Mar. 1, 2013 (Mar. 1, 2013), XP055168644, 3 pages.
Myrto Arapinis et al., "Quantum Physical Unclonable Functions: Possibilities and Impossibilities," IACR, International Assoc. for Cryptologic Research, vol. 2019010:125700, Oct. 10, 2019 (Oct. 10, 2019), 47 pages.

\* cited by examiner

3nm FILTER & 220ps 1.2nm FILTER & 240ps

METHODS, PROTOCOLS, AND APPARATUSES OF QUANTUM PHYSICAL UNCLONABLE FUNCTIONS

CROSS-REFERENCE TO RELATED APPLICATIONS

This is an application under 35 U.S.C. § 371 of International Application No. PCT/US2022/038068 filed Jul. 22, 2022, and entitled, "METHODS, PROTOCOLS, AND APPARATUSES OF QUANTUM PHYSICAL UNCLONABLE FUNCTIONS," which claims priority to U.S. Provisional Patent Application Ser. No. 63/224,820 filed Jul. 22, 2021, the entireties of all of which applications being incorporated herein by reference when and where permissible.

STATEMENT REGARDING FEDERALLY SPONSORED RESEARCH

None

FIELD OF THE INVENTION

The present invention relates to information security, and specifically, a quantum physical unclonable functions (QPUF) protocol for device authentication, identification, verification, secure communications, and proof of existence.

BACKGROUND OF THE INVENTION

Methods of storing secret information in modern communication using digital memory cannot be proven to be unconditionally secured because they can be changed, counterfeited, or stolen. Thus, security is not guaranteed when a communication node identifies itself by providing "secret knowledge" instead of "physically presenting its irreplaceable uniqueness." An emerging technique to verify device integrity and authenticity is embedding physical unclonable functions (PUFs) into hardware to act as "fingerprints." PUFs harvest intrinsic randomness from sensitive fabrication processes in micro or nanoscale such as mismatch of threshold voltage in transistors (i.e., SRAM PUF), physical orientation of accelerometers reacting to different electrostatic impulses (MEMS PUF), or optical interactions in a chaotic silicon micro-cavity, etc. This approach means that given different inputs into a PUF device, different outputs will not only be unique and repeatable but also non-deterministic. In other words, the PUF provides a one-way function that is inexpensive, easy to evaluate, but difficult to predict. Moreover, the task of reproducing identical PUFs is considered impractical even for the creator of the PUF due to uncontrollable errors in manufacturing procedure.

Conventional methods for PUF protocols use challenge-response pairs (CRPs) where each PUF device's responses are measured given different input challenges to produce one or many CRPs at the manufacturer. Lists of CRPs are stored safely and considered as "code book" for each device. During the verification process, if a challenge is repeated and its corresponding response matches with the one in the "code book", the device is successfully authenticated. However, if an adversary gains access to the CRPs information, PUF device authentication is no longer secured since the adversary could respond to the query without applying the challenge to the PUF. Therefore, protecting the CRP database from this type of digital emulation attack is a challenge to this approach. Another type of attack is that if an adversary can physically access the PUF device, even though the adversary cannot replicate it, he is still able to study the device and collect some CRPs information for further attacks. In addition, conventional PUF protocol is vulnerable to machine learning attacks. Even for strong PUF devices that produce a large number of CRPs wherein each CRP is used only once, access to the device still gives the adversary the opportunity to use machine learning to predict the unknown responses from the known CRPs sets he took.

There is one known method for achieving device verification that is remote and independent from the secrecy of databases called quantum-readout PUF. However, this protocol is not secured against quantum emulation attacks. Moreover, quantum-readout PUF requires large amounts of CRP memory which is inconvenient to accommodate memory-limited devices. Another drawback with this protocol is that it depends on trusted devices.

SUMMARY OF THE INVENTION

The method disclosed herein aims at providing a PUF protocol that is immune against digital emulation attacks, machine learning attacks, quantum computer attacks, and CRP database attacks.

The disclosed embodiments take a different approach and provide an unconditionally secured method based on quantum physics, including quantum entanglement and quantum superposition. The present invention may serve as a next-generation authentication technique for credit card uses, banking systems, telecommunications, etc.

Traditionally, in an authentication process, a prover must show the device's uniqueness that matches with information in the CRP code book known by the verifier. However, the present protocol redefines the meaning of a successful verification/authentication by using a unique signature assembled from correlations taken from outputs of physical one-way functions from all communication parties.

For instance, at the point of manufacture, PUF A, PUF B, and PUF C are measured to extract the correlation information between them based on quantum entanglement, creating measurement results in the form of signatures AB, AC, BC. These signatures are stored in the public database and are known to all parties, obviating the need for secured databases. By eliminating the need for any private code book at all, the present invention eliminates a security loophole in conventional PUF protocols.

The three PUF devices (i.e., PUF A, PUF B and PUF C) are then distributed to users Alice, Bob, and Charles, respectively. To perform a mutual authentication process, Alice and Bob publicly perform correlation measurement to construct a unique signature between the two of them. If this signature is matched with signature AB in the database, authentication is successful. Similarly, when Alice wants to authenticate herself with Charles or vice versa, they again perform the correlation measurement to construct a unique publicly known signature between the two of them and then compare that with AC. Consequently, the method allows each party to authenticate itself to each other simultaneously and to the public as well. FIG. 1 shows an example of a QPUF database, which is basically a storage of different QPUF patterns corresponding to their designated QPUFs. In an embodiment, the database can be stored and accessed publicly.

The disclosed invention provides a method for unconditionally secure QPUF where device's signatures are based on correlation measurements of quantum complementary variables (e.g., the photon arrival time and carrier frequency)

after entangled photons interact with optical chaos. In one embodiment, with an energy-time degree of freedom, the uniqueness of the device pair is defined as the intensity correlations of entangled photons in frequencies and/or arrival times. The protocol of this disclosed invention does not rely on trusted devices to complete a successful authentication.

One implementation of the present invention involves a laser source, an entangled photon source, single photon detectors, photonic chaos chips that provide physical one-way functions, photon arrival time measurement devices, photon frequency measurement devices, and a public database of correlation measurement results.

In an embodiment, authentication can be carried out through the steps of generating a set of entangled photons, transmitting each entangled photon to a corresponding one of the devices, wherein each device embodies a corresponding physical unclonable function that together have a known quantum correlation signature, recording a response from each device based on the corresponding physical unclonable function of that device, repeating the aforementioned steps to build-up a verification pattern from the recorded responses, comparing the verification pattern with the known quantum correlation signature, and authenticating should a similarity threshold between the verification pattern and the known quantum correlation signature be achieved. In an embodiment, entanglement of the entangled photons is performed by periodically diverting entangled photons away from the devices for verification purposes.

In an embodiment, the quantum correlation signature is public knowledge and can, for instance be established by the manufacturer of the devices.

In an embodiment, the authentication method is performed in a public channel.

In an embodiment, the quantum correlation signature can be based on quantum complementary variables after the entangled photons interact with optical chaos. For instance, the optical chaos can be provided by physical unclonable function nanostructures of each device. In an embodiment, the physical unclonable function nanostructures can comprise chaotic light-transmission media. In an embodiment, the quantum complementary variables can be based on photon arrival time and/or carrier frequencies. In a further embodiment, the quantum correlation signature is defined based on intensity correlations of the entangled photons in frequencies and/or arrival times.

In an embodiment, the authentication method can make use of a reference signal continuously transmitted to each device.

In a further embodiment, the known quantum correlation signature is based on one or more of joint spectrum intensity, joint temporal intensity or joint spectral temporal intensity.

In yet another embodiment, security can be strengthened by selectively maintaining in confidence at least some of the recorded responses.

In an embodiment, the recorded responses are announced publicly in order to build-up the verification pattern. Furthermore, a secure method of communication can be accomplished simultaneously with the authentication by encoding a confidential message into the recorded responses by a sender and decoding the confidential message from said recorded responses by a receiver. For instance, the decoding step can be performed on the recorded responses by way of maximizing similarity with the verification pattern when calculating the verification pattern. Meanwhile, the encoding step may be performed according to a publicly agreed protocol. To this end, the publicly agreed protocol could comprise a finite number of swapping actions. This would allow the decoding step to be performed by exhaustively trying all of the finite number of swapping actions.

BRIEF DESCRIPTION OF THE DRAWINGS

For a more complete understanding of the present invention, reference is made to the following detailed description of an embodiment considered in conjunction with the accompanying drawings, in which:

FIG. 10 is a schematic diagram showing an example of a two-party QPUF system;

Figure 12:
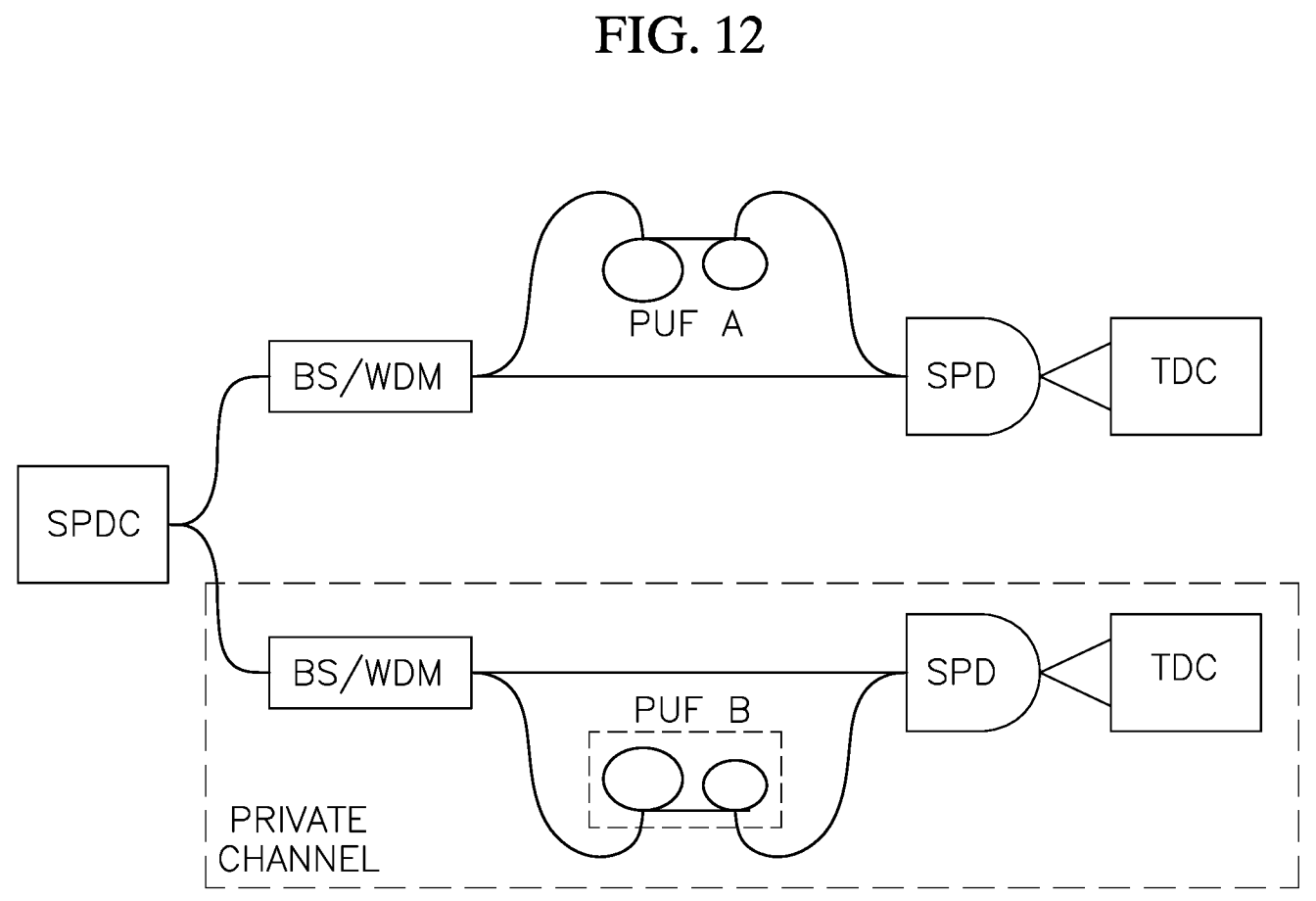

FIG. 12 shows a further example of how a two-party QPUF system can be implemented.

DETAILED DESCRIPTION OF THE EXEMPLARY EMBODIMENT

Figure 1:
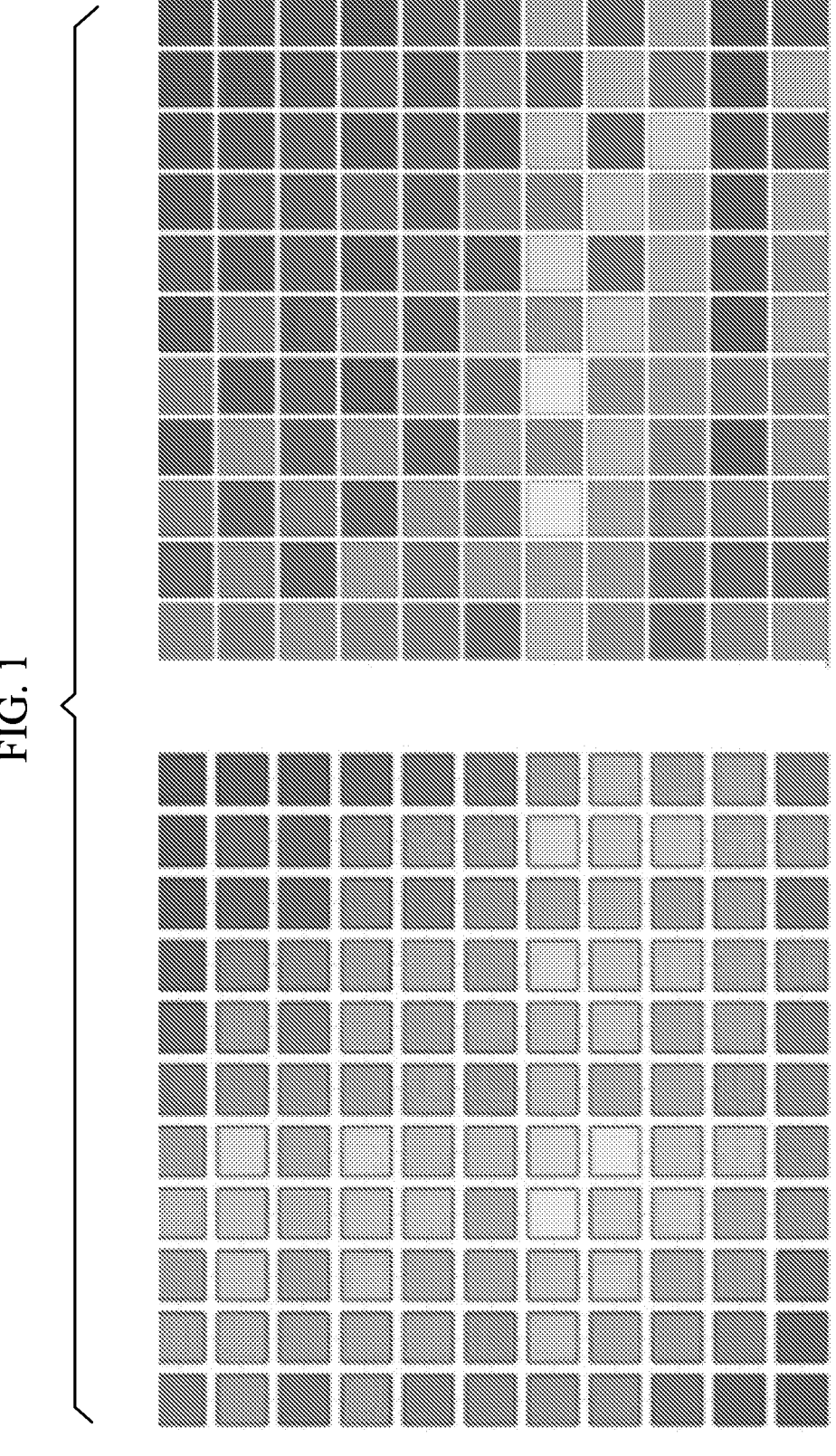
FIG. 1 an example of a QPUF database containing two QPUF patterns.
Figure 2:
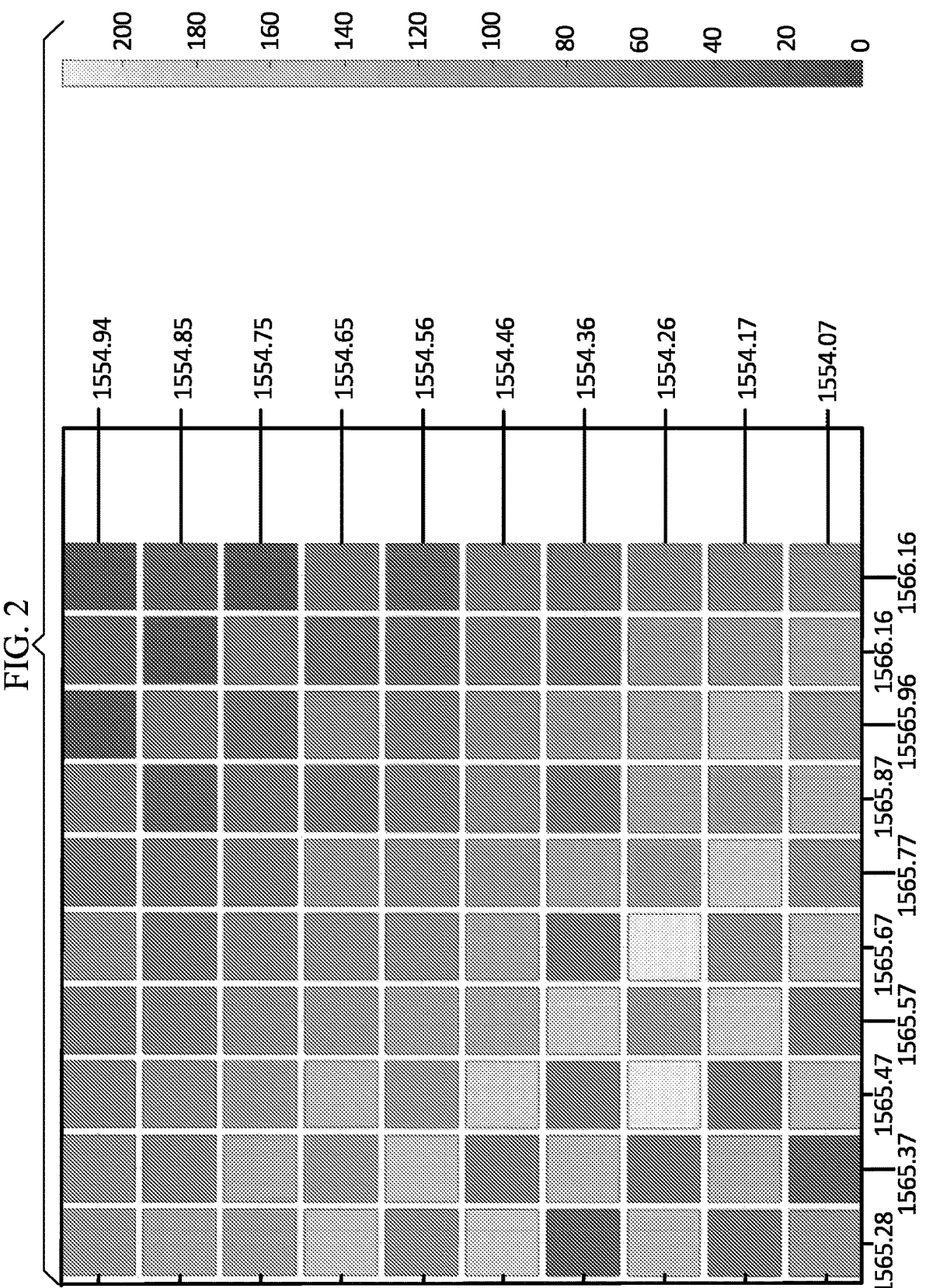
FIG. 2 is an example of a joint spectrum intensity verification pattern.
Figure 3:
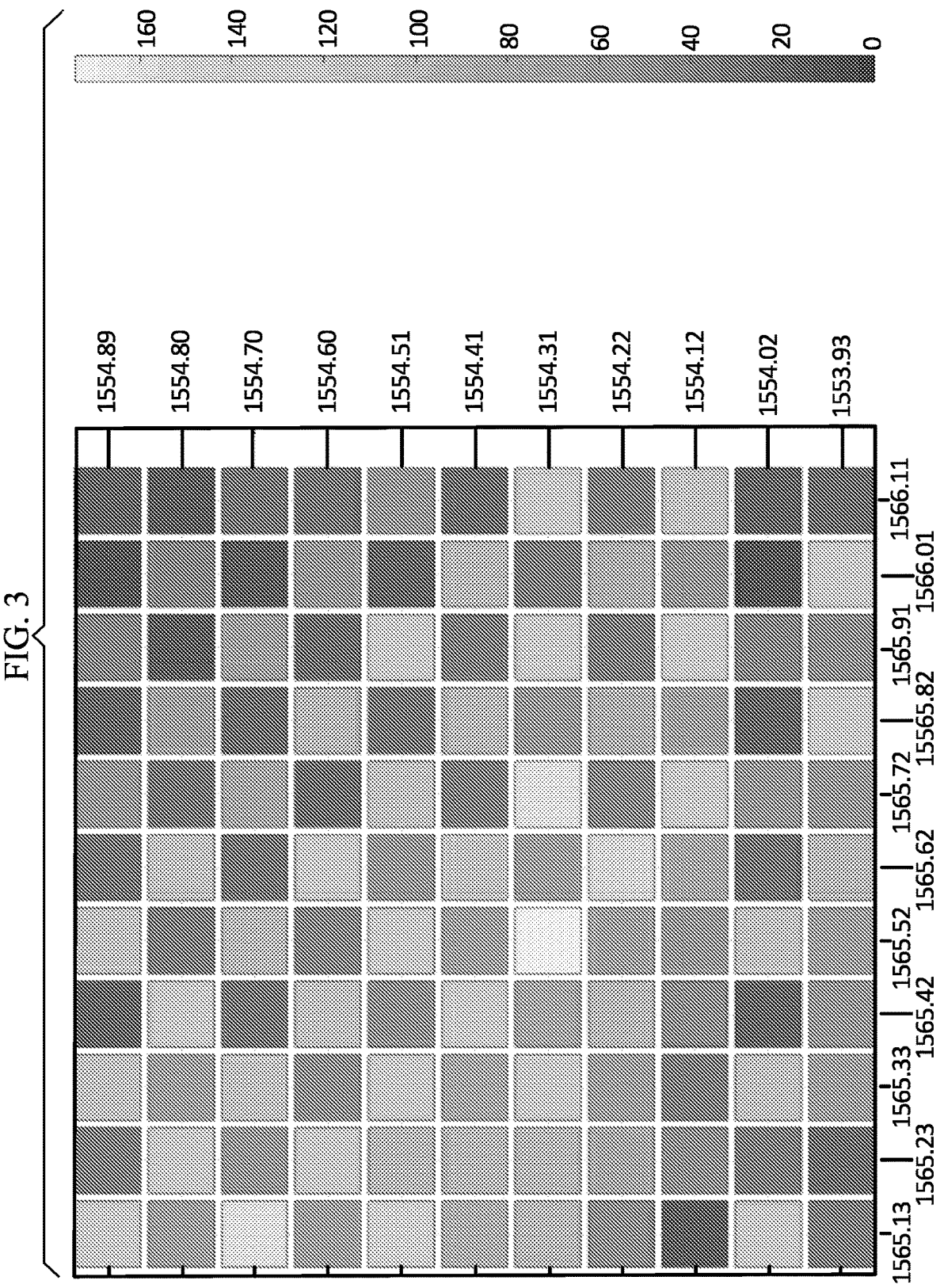
FIG. 3 is another example of a joint spectrum intensity verification pattern.
Figure 4:
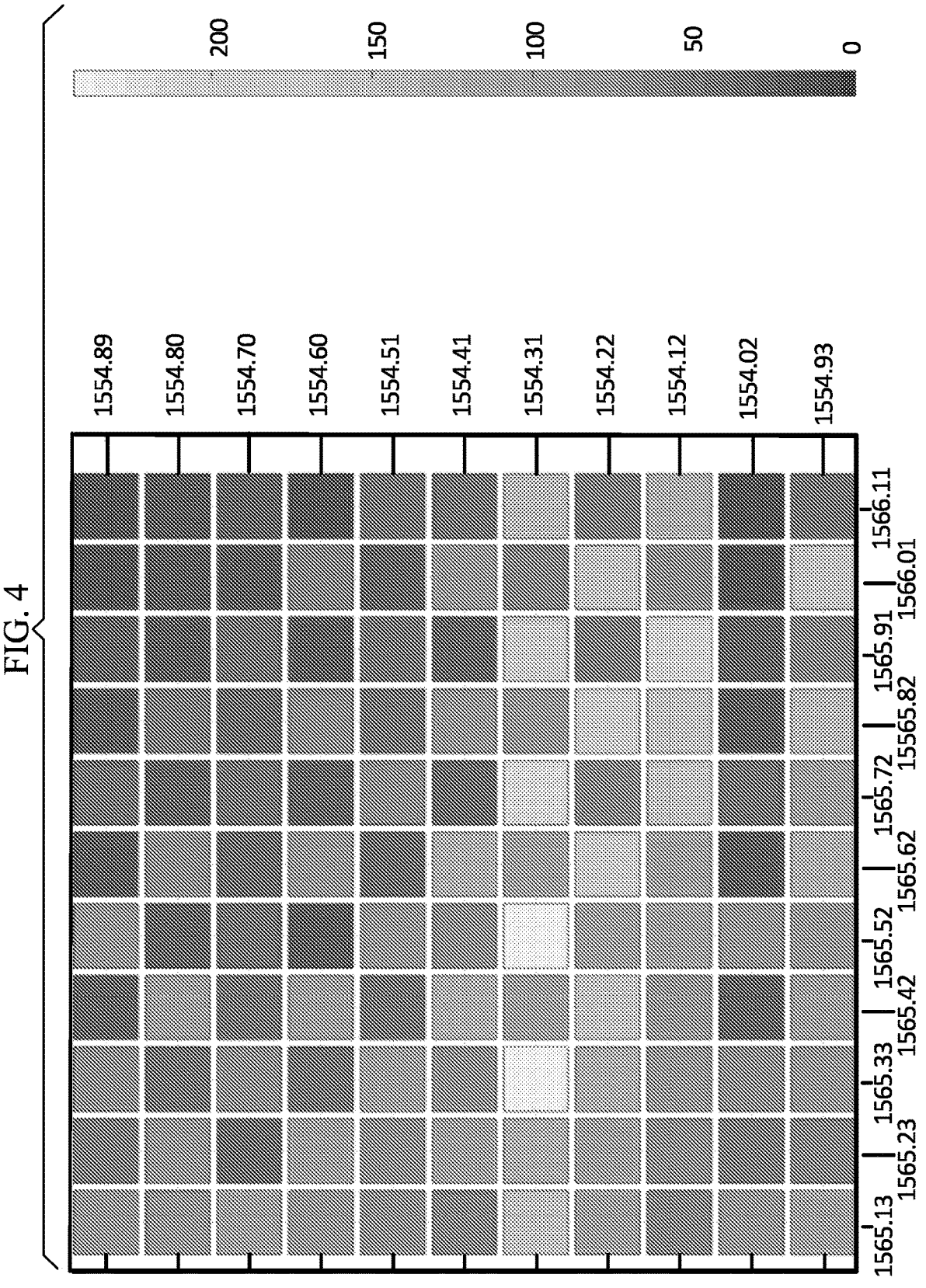
FIG. 4 is a further example of a joint spectrum intensity verification pattern.
Figure 5:
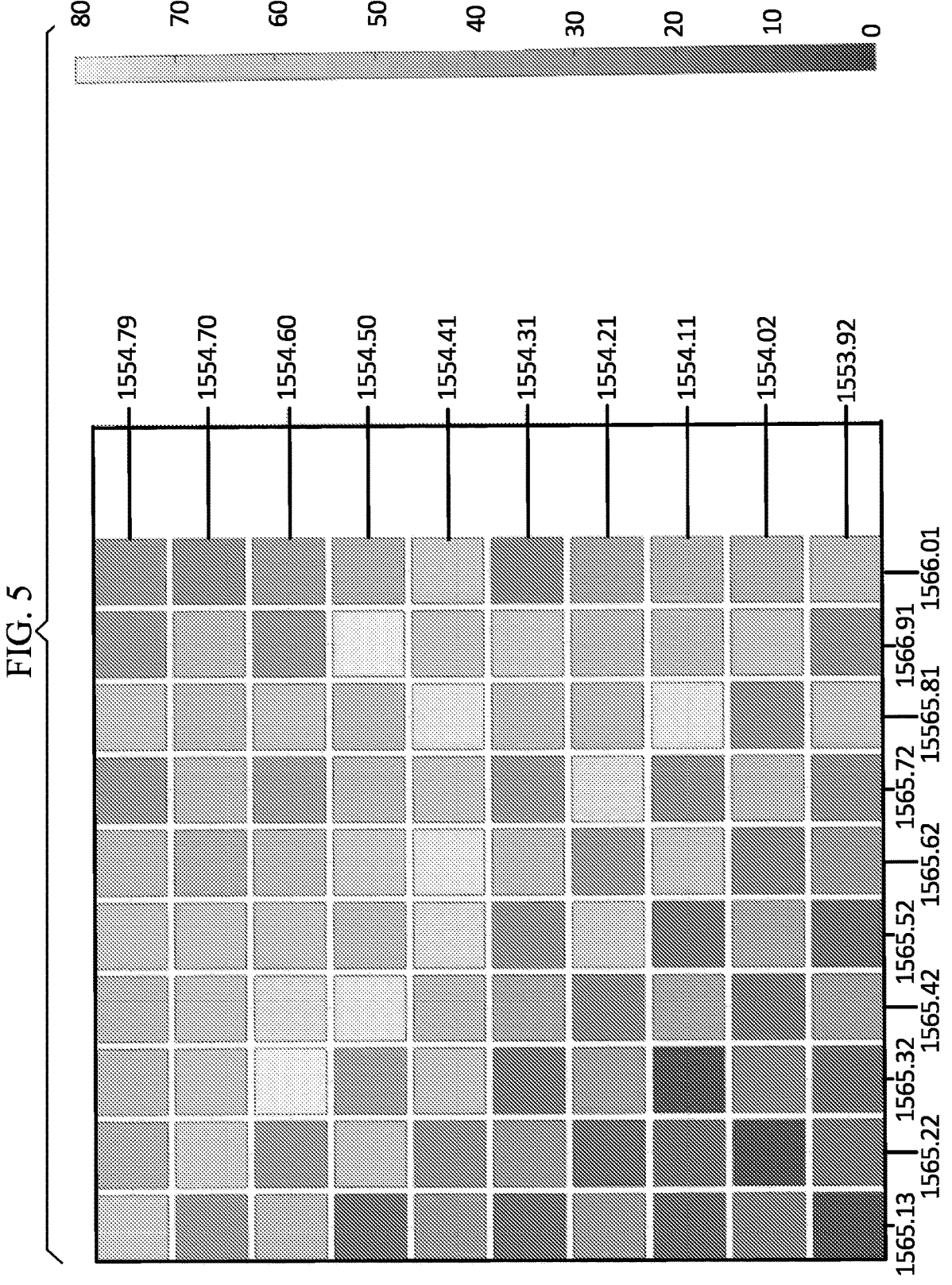
FIG. 5 is yet another example of a joint spectrum intensity verification pattern.
Figure 6:
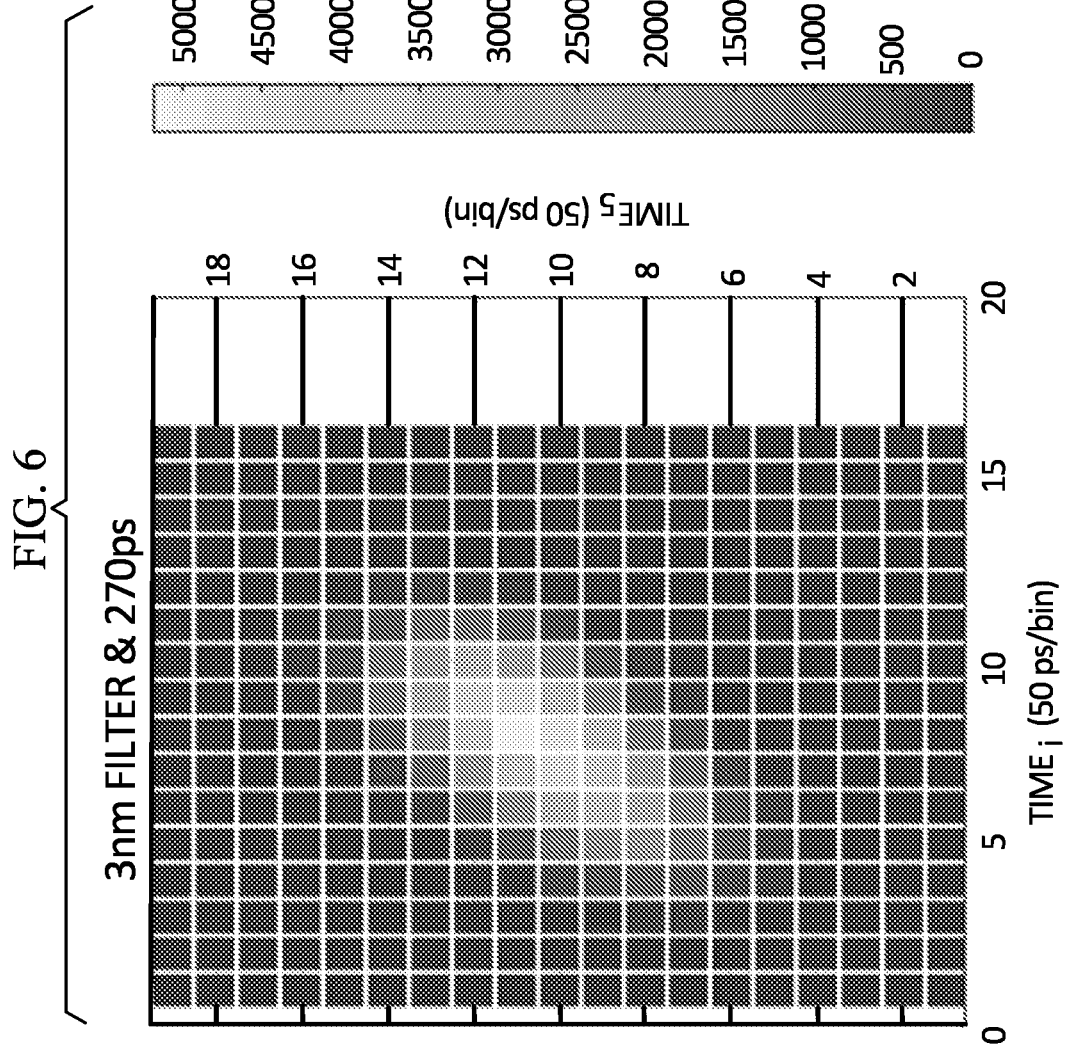
FIG. 6 is an example of a joint temporal intensity verification pattern.
Figure 7:
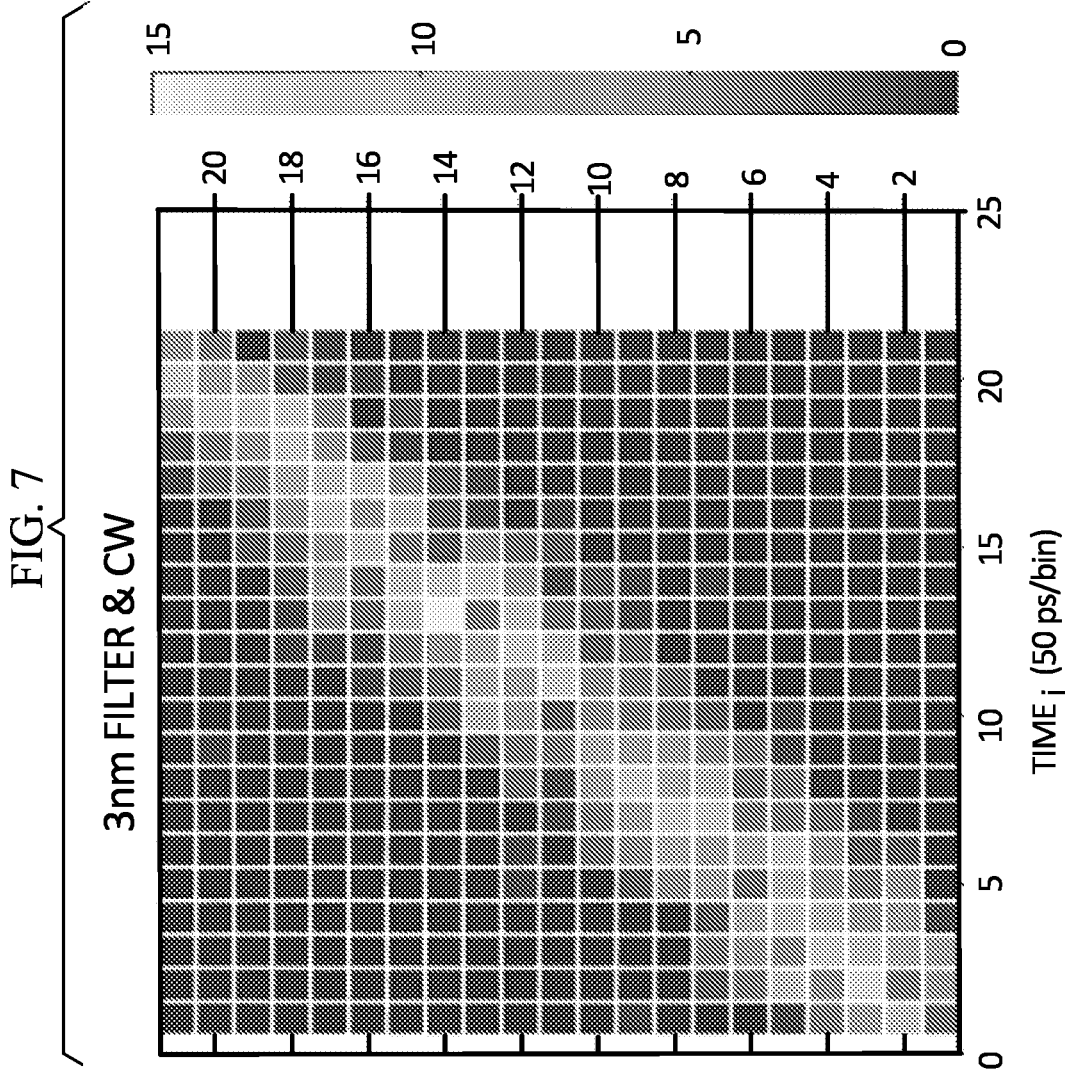
FIG. 7 is another example of a joint temporal intensity verification pattern.
Figure 8:
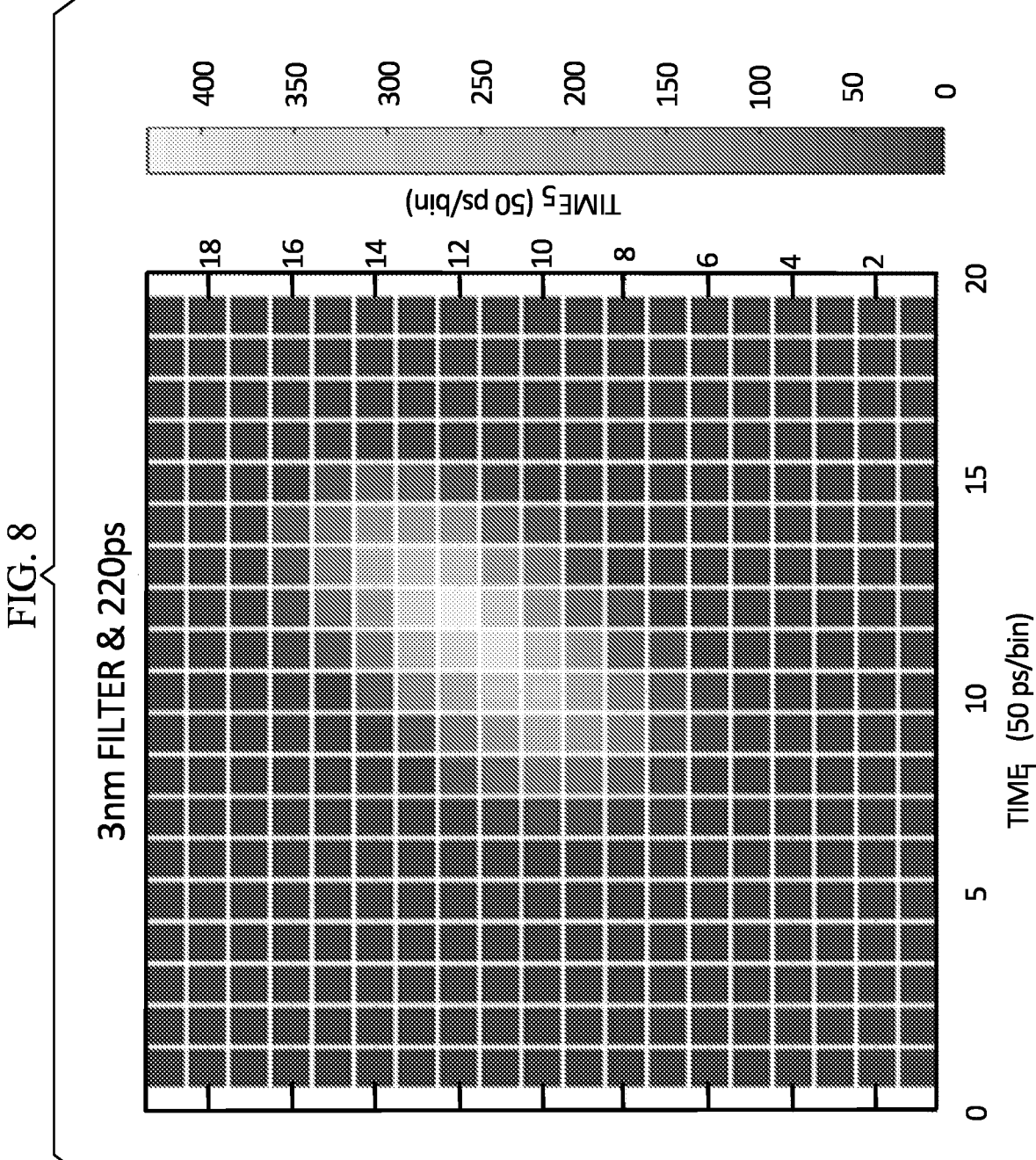
FIG. 8 is a further example of a joint temporal intensity verification pattern.
Figure 9:
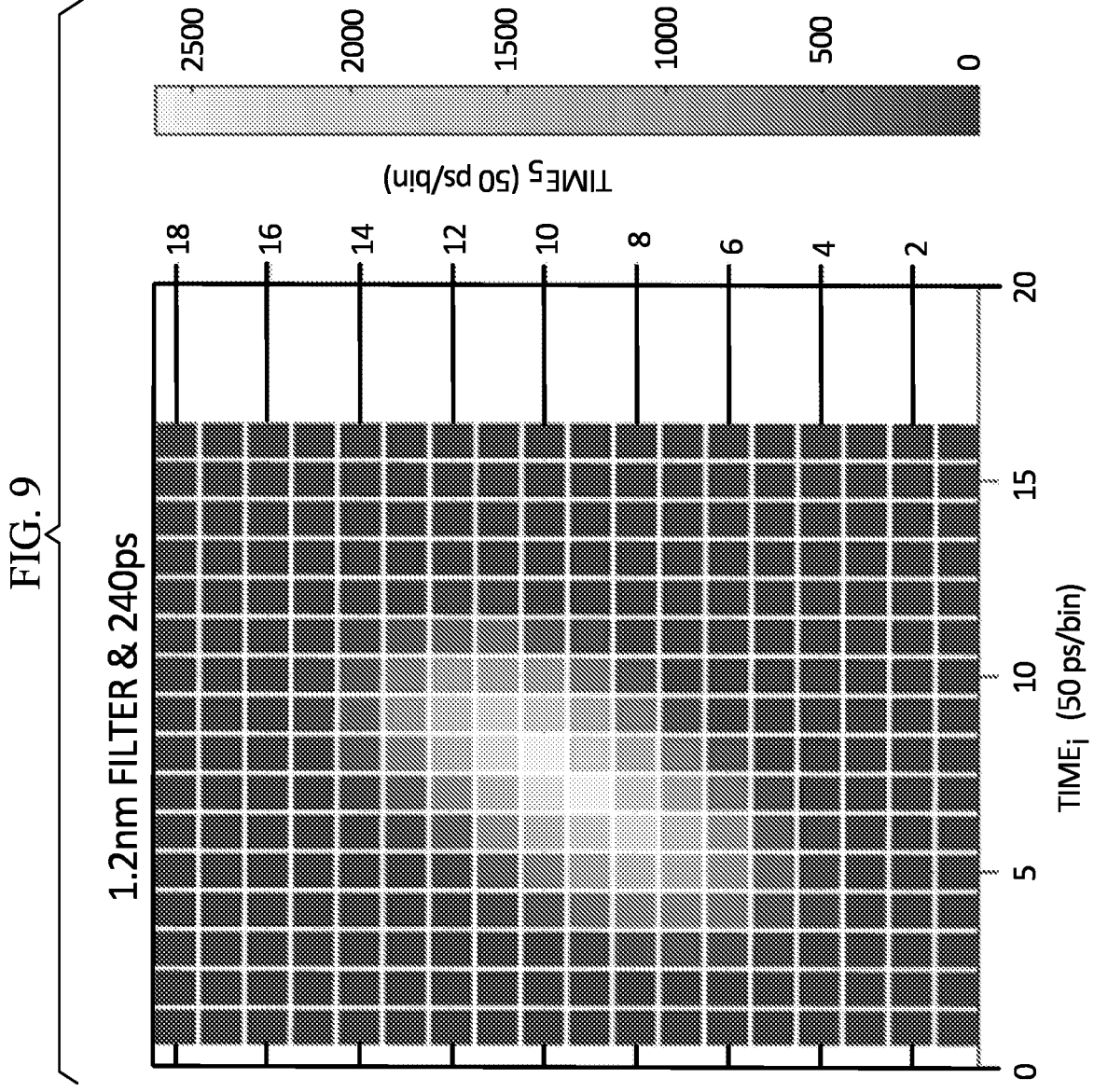
FIG. 9 is yet another example of a joint temporal intensity verification pattern.
Figure 11:
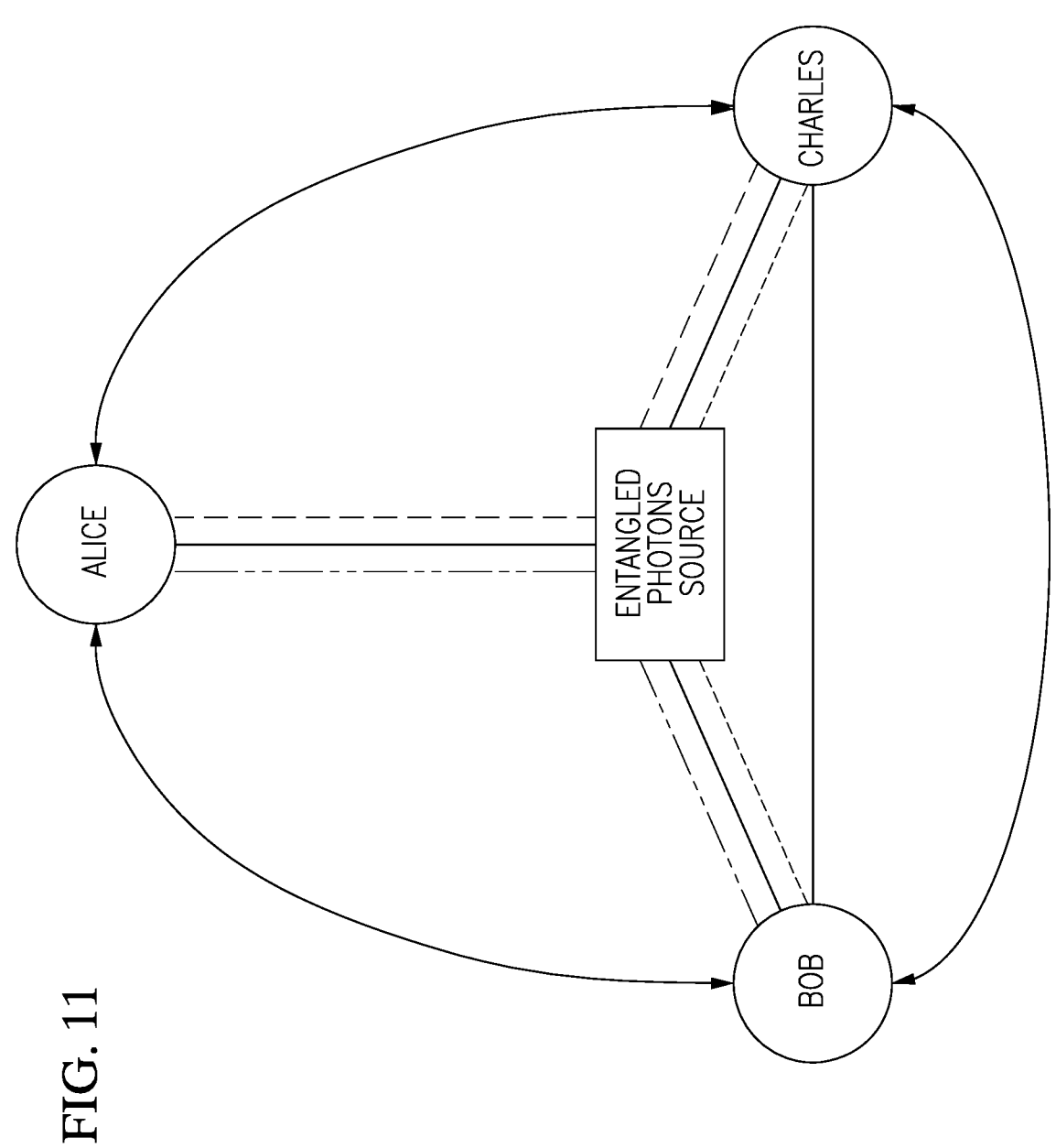
FIG. 11 shows an example of how a QPUF system can be implemented.

The following disclosure is presented to provide an illustration of the general principles of the present invention and is not meant to limit, in any way, the inventive concepts contained herein. Moreover, the particular features described in this section can be used in combination with the other described features in each of the multitude of possible permutations and combinations contained herein.

All terms defined herein should be afforded their broadest possible interpretation, including any implied meanings as dictated by a reading of the specification as well as any words that a person having skill in the art and/or a dictionary, treatise, or similar authority would assign thereto.

Further, it should be noted that, as recited herein, the singular forms "a", "an", "the", and "one" include the plural referents unless otherwise stated. Additionally, the terms "comprises" and "comprising" when used herein specify that certain features are present in that embodiment, however, this phrase should not be interpreted to preclude the presence or addition of additional steps, operations, features, components, and/or groups thereof.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

To better illustrate an exemplary QPUF protocol in accordance with an embodiment of the present invention definitions of the following will be given: joint spectrum intensity (JSI), joint temporal intensity (JTI), joint spectral temporal intensity (JSTI), challenge-response pairs (CRPs), quantum entanglement processes, PUF nanostructures, measurement synchronization, and threshold verification.

JSI refers to two photon correlation functions as measured in each's spectral state (i.e., the correlation of their carrier frequencies). JTI refers to two photon correlation functions as measured in each's temporal state (i.e., the correlation of their arrival times). JSTI refers to two photon correlation functions as measured in one's spectral state and the other's temporal state (i.e., the correlation of one's arrival time with the other's carrier frequency). CRP refers to an input state paired with a PUF and the expected output state. For the purposes of this disclosure, quantum entanglement processes are any processes where two or more objects are subject to inherent quantum non-local correlation. The PUF devices contain PUF nanostructures with inherent imperfections and/or uncontrollable random features that cannot be replicated by any manufacturing means. Measurement Synchronization is a process to synchronize the time stamps of distant communication parties so that JTI, JST, and/or JSTI can be carried out successfully. Threshold Verification is a test that will return a positive verification result if a measured quantity is above a certain threshold.

Figure 10:
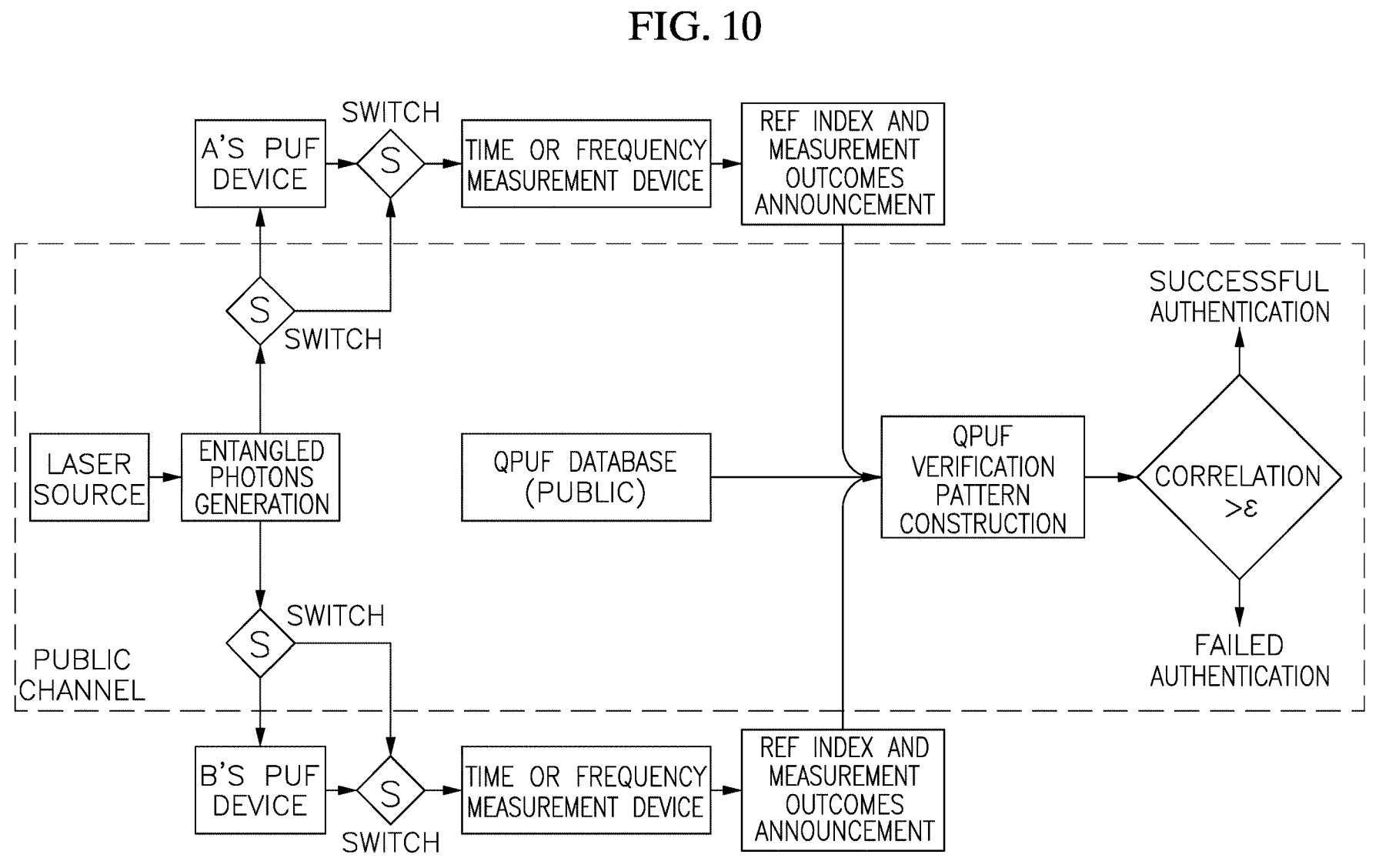

A schematic of a QPUF protocol is given in FIG. 10. At the manufacturer, QPUF CRPs are collected by measuring the JSI, JTI or mixed JSTI of entangled photons after they are sent through different PUF nanostructures to allow for chaotic responses. Given consistent components (e.g., filters, single photon detector, arrival time converter, etc.) between the combinations of PUF devices, the energy and momentum conservation of the entangled photons generation process ensures an unchanged correlation pattern of the JSI, JTI, and JSTI. At every authentication attempt, these patterns are constructed by collecting different sets of truly random and uncontrollable sequences of data points, according each communicating party's local measurement of the photons after interaction with the individual's PUF, owing to quantum superposition. As a result, a JSI/JTI/JSTI created after entangled photons passing through PUFs forms a unique joint pattern, yet all measurement data are one-time pads. This feature enables the CRP database, which can be generated at the point of manufacture, to be stored in a publicly accessible manner without compromising security. Thus, unlike conventional PUFs where devices are measured to generate many CRPs at the point of manufacture, QPUF protocol requires only one pattern.

The proposed protocol can be used irrespective of the PUF's nanostructure, or the physical basis of the PUF. The PUF device can have any type of structure that provides photonic chaos responses that are highly complex and unpredictable, yet are reproducible given the same inputs. Such nanostructures have been designed and shown to satisfy the necessary PUF characteristics. In some embodiments, chaotic light-transmission media can serve as PUFs for the purpose of secured authentication.

In order to align contemporaneous measurements, REF IDs can be used by the communication/verification parties. For the purpose of this disclosure, REF IDs are reference identification numbers and/or pulse indices representing the time slot number of a detected photon whether it is detected in time or frequency. To enable common REF IDs, all parties in the communication pool are synchronized to a common reference signal in order to identify their detected photon time slots. Such a reference signal can be supplied through the same optical communication channels (i.e., quantum optical communication channels) used to distribute the entangled photons. Such channels can make use of the same telecommunication fiber infrastructure that presently exists. Also, in the future, the communication channels are expected to be pervasive due to anticipated future adoption of quantum information technology. In some embodiments, a reference can be in the form of an optical pulse train that is split and distributed via optical fibers or free space communications. The system should be set up such that at most one entangled photon pair can be created during each period of the reference pulse. Therefore, if the communication parties receive photons that are entangled with the others' photons, they will have a high likelihood to be detected in identical time slots. A verification pattern is formed from many quantum states given in frequency or time. To this end, the REF IDs serve as a mechanism of synchronization which enables identification of which photons belong to which entangled states.

The source of entangled photons can come from a verifier, a third party, a service provider, or from the public. Entanglement of the photons should be verified before and during their uses for the QPUF. This can be done mutually between User A and User B, in a manner similar to entanglement verification during typical quantum key distribution protocols. It can also be done through a public verifier. In an exemplary embodiment, entanglement validation is done by bypassing the PUFs and having User A and User B each construct the JSI and JTI. This validation exploits the fact that only those truly entangled photons will yield inseparable JSI and JTI simultaneously. Such JSI and JTI may be public knowledge. JSI and JTI are independent of transmission loss, but they depend on the characteristics of the source and the resolution of the measurement devices employed.

To prevent dishonest parties from cheating during the entanglement validation, each party can elect to share only about half of its photon counting results with the other, while keeping the other half for verification purposes. For security reasons, in some embodiments, only when both parties agree on the entanglement validation shall the QPUF continue. In an exemplary embodiment, such verification shall be conducted during the QPUF process by using a passive or active switch to bypass the PUF. To this end, Users A and B can randomly select to have some pulses bypass the PUF and used solely for entanglement validation purposes.

Assuming the entanglement validation is successful, Users A and B can announce their Reference IDs publicly. They will first compare the IDs and select those matching ones (i.e., the IDs appearing on both Users A and B's lists). Then they will split the matching IDs into two about equal subgroups. User A will report publicly his/her measurements (e.g., time or frequency) for all Reference IDs within one subgroup, and User B will report on the other subgroup. This reporting arrangement can be performed over public channels. Once these results have been announced, the Users can proceed with checking the announced measurement results with their respective secret, unpublished results by comparing them with the public pattern (i.e., the database signature).

In order to complete the final verification, the similarity between the public database signature and the measured (i.e., calculated) signature is calculated, and the verification succeeds if the similarity is above an established threshold, and it fails if below the threshold. The threshold is determined by the properties of the PUF devices being used, such that no substitute PUF device can be used to create a signature above the threshold. The threshold requires a quantity of photon number statistics in order to suppress inherent photon counting noise and possible detector dark counts.

Losses during transmission will affect the verification process time length. Entangled photons must be sent continuously until the photon number statistics are obtained, allowing for enough information to be compared with the unique identifier/response in the public database.

Example 1

For the purpose of simplicity, the following discussion will assume that the authentication process involves only two parties; however, it should be noted that the methods of the present invention may be applied to perform authentication simultaneously with more than two parties as well. This can be achieved by using higher orders of nonlinearity, for example, by creating three entangled photons for three parties, creating four entangled photons for four parties, etc. FIG. 10 demonstrates an example of QPUF protocol between two parties A and B. Below are the steps of QPUF protocol where parties A and B want to authenticate each other, or when A or B want to prove their identity to the public. In other embodiments, party A can to prove their identity to party B, or vice-versa.

Step 1: A and B announce in public that they want to perform authentication to each other.

Step 2: Entangled photons are sent to parties A and B.

In this step, the entangled photons on both sides will be randomly switched to bypass the PUFs and directly enter JSI, JTI, or JSTI measurement. The events where the entangled photons bypass the PUFs will be announced publicly and the JSI, JTI, and JSTI results will be constructed to verify their entanglement. As a security feature, as soon as the verification fails, the authentication may be aborted.

Step 3: Parties A and B individually measure their entangled photons in time or frequency. FIG. 10 is an example of a two-party QPUF protocol system setup. As previously mentioned, one can measure photon properties in time or frequency. Measurement resolution influences the number of pixels which must be agreed upon by all communication parties in the verification pattern in order to successfully authenticate.

Step 4: Parties A and B both announce their photons' REF ID followed by their measurement outcomes.

Step 5: Verification patterns are constructed in the public channel using responses of each PUF device. In some embodiments, information from laser and entanglement source may be described as the equation below:

$$\varphi(\omega\_s,\omega\_i)=\psi(\omega\_s,\omega\_i)\sqrt{(p\_1(\omega\_s))}\sqrt{(p\_2(\omega\_i))} \qquad (1)$$

where $\psi$ $(\omega\_s, \omega\_i)$ is an entangled photon state which can be a product of spectral profiles of pump photons, phase matching of the nonlinear media, filters, etc. This information is publicly announced and stored and kept consistent during the database signature creation and identity verification processes. From the database, $p\_1$ $(\omega\_s)$, $p\_2$ $(\omega\_i)$ are PUF responses of each communication end. Therefore, the joint spectral intensity verification pattern $\varphi$ $(\omega\_s, \omega\_i)$ is derived and used as a unique "fingerprint" between party A and B. Similarly, one can form other verification patterns using time domain by constructing $\varphi(t\_s, t\_i)$ or mixed time and frequency domain by constructing $\varphi$ $(\omega\_s, t\_i)$ or $\varphi$ $(t\_s, \omega\_i)$. FIG. 1. shows examples of verification patterns, wherein the grayscale coloring represents intensity (e.g., temporal intensity, spectral intensity, etc.).

Step 6: A public channel collects measurement outcomes from parties A and B to build up a verification pattern. Due to superposition properties of quantum mechanics, photons are simultaneously in all states until measured, and the outcomes are intrinsically random because they collapse equally likely into any possible states. Even though every successful authentication returns an identical verification pattern, each series of measurement outcomes from A and B are random every time. Hence, knowledge of the verification pattern does not provide any beneficial information for adversaries to attack or spoof or perform any brute force search methods.

Step 7: The verification pattern is compared with the one stored in the public database to obtain the difference. If this difference is below an error threshold, authentication is successful.

Now system prerequisites to guarantee an unconditionally secure authentication protocol will be discussed. First, PUF devices must satisfy all PUF requirements: being physically irreplicable, providing reproducible responses, and providing unique responses. However, it does not need to be unpredictable. For example, machine learning or quantum computer attack can only predict the response of a PUF device. Meanwhile, a successful authentication or verification depends upon joint measurements, which are truly random by quantum mechanics. Second, pump photons must be maintained at a low power level to avoid the generation of multi-pairs of entangled photons. Third, witnessing of entanglement has to be verified during the process. Lastly, the number of possible photon states in time or frequency have to be numerous enough such that they create an abundant number of possible unique identifiers to avoid different PUF devices returning the same joint unique identifier. Given n number of possible states on party A, m number of possible states on party B, and k number of possible joint intensity levels that can be unambiguously resolved (given sufficient detected photon number statistics), the total possible unique identifiers is $P=k^{((n \times m))}$. If k=100, as is the case for a typical coincident to accidental ratio (CAR) used in quantum key distribution systems, and n=m=5, $P={ 10 }^{ ^50}$ which equals approximately the total number of particles on Earth.

Example 2

In some applications, the same QPUF verification system can be used for verification and secure communications at the same time. In one embodiment, User A will shuffle/exchange/modify the indices of his/her measurement results before announcing. User B will attempt to de-shuffle/de-exchange/de-modify the results in order to maximize the similarity of the measured signature with the database signature. If the maximal similarity is higher than the threshold, then the identity of User A is verified. Meanwhile, User B will know how User A has shuffled/exchanged the measurement results, from which User A and B can securely communicate certain information.

As a simplified example, User A's original measurement results are (1, 3, 4, 3, 2, 4), each representing a time or frequency, according to a certain publicly agreed indexing protocol. User A wants to prove to User B his/her identity while sending the message "11" or "00." To this end, User A will announce publicly that he/she will swap the index 1 with 3 if the message is "11", and swap 1 with 4 if the message is "00". According to this protocol, User A will announce the measurement results as (3, 1, 4, 1, 2, 4). User B, after receiving User A's measurement results, will try the two swapping actions and combine them with User B's own measurement results to find if any action gives similar patterns and passes the similarity threshold test. If the test is passed, then User B will not only verify User A's identity but also get the correct message.

There are many other ways of information coding. However, such information needs to be well defined and not be complicated, so that User B can exhaustively try all possible encoding protocols.

It will be understood that the embodiments described herein are merely exemplary and that a person skilled in the art may make many variations and modifications without departing from the spirit and scope of the invention. All such variations and modifications are intended to be included within the scope of the invention.

What is claimed is:

1. A method for secure authentication, comprising the steps of:

i) generating a plurality of entangled photons;

ii) transmitting each photon of said plurality of entangled photons to a corresponding one of at least a pair of devices, each device of said at least a pair of devices embodying a corresponding physical unclonable function having a known quantum correlation signature;

iii) recording a response from one device of said at least a pair of devices based on said corresponding physical unclonable function of said one device;

iv) recording a response from another device of said at least a pair of devices based on said corresponding physical unclonable function of said another device;

v) repeating steps i)-iv);

vi) calculating a verification pattern from responses recorded via the performance of steps iii) and iv), said recorded responses being announced publicly in accordance with the performance of this step;

vii) comparing said verification pattern with said known quantum correlation signature;

viii) authenticating if a similarity threshold between said verification pattern and said known quantum correlation signature is achieved based on said comparing step;

ix) encoding a confidential message into said recorded responses according to a publicly agreed protocol that comprises a finite number of swapping actions; and x) decoding said confidential message from said recorded responses, wherein said decoding step is performed on said recorded responses by maximizing similarity with said verification pattern when said verification pattern is being calculated in accordance with the performance of step vi).

2. The method of claim 1, further comprising the step of validating entanglement of said plurality of entangled photons.

3. The method of claim 2, wherein said validating step is performed, for verification purposes, by periodically diverting some entangled photons of said plurality of entangled photons away from said at least a pair of devices.

4. The method of claim 1, wherein said known quantum correlation signature is public knowledge.

5. The method of claim 4, wherein said known quantum correlation signature is established by the manufacturer of said at least a pair of devices.

6. The method of claim 1, wherein step v) is performed in a public channel.

7. The method of claim 1, wherein said quantum correlation signature is based on quantum complementary variables after said plurality of entangled photons interact with optical chaos.

8. The method of claim 7, wherein said optical chaos is provided by physical unclonable function nanostructures of each device of said at least a pair of devices.

9. The method of claim 8, wherein said physical unclonable function nanostructures comprise chaotic light-transmission media.

10. The method of claim 7, wherein said quantum complementary variables are based on photon arrival time and/or carrier frequencies.

11. The method of claim 7, wherein said quantum correlation signature is defined based on intensity correlations of entangled photons in frequencies and/or arrival times.

12. The method of claim 1, further comprising the step of continuously transmitting a reference signal to each device of said at least a pair of devices.

13. The method of claim 1, wherein said known quantum correlation signature is based on one or more of joint spectrum intensity, joint temporal intensity or joint spectral temporal intensity.

14. The method of claim 1, further comprising the step of selectively maintaining in confidence, for security purposes, at least some of said responses recorded via the performance of step iii) and/or step iv).

15. The method of claim 1, wherein said decoding step is performed by exhaustively trying all of said finite number of swapping actions.

* * * * *